Sept. 27, 1938.   J. J. GOUGH   2,131,278
ELECTRIC TOASTER WITH DETACHABLE SHELL
Original Filed April 9, 1936   2 Sheets-Sheet 1
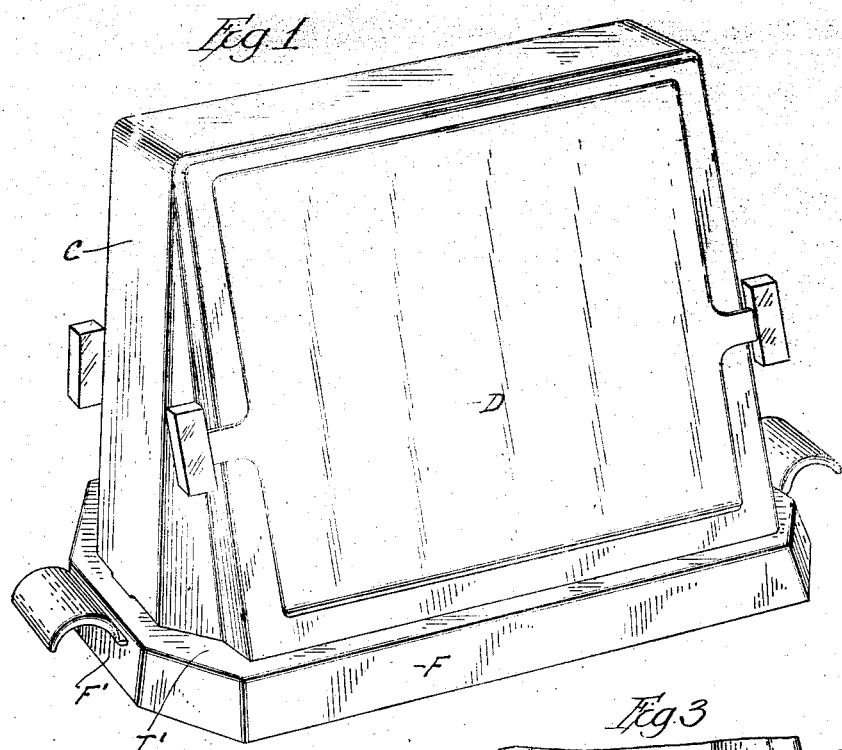
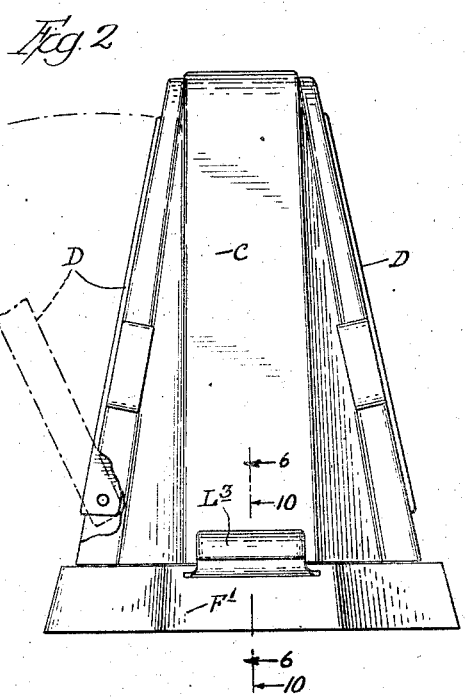
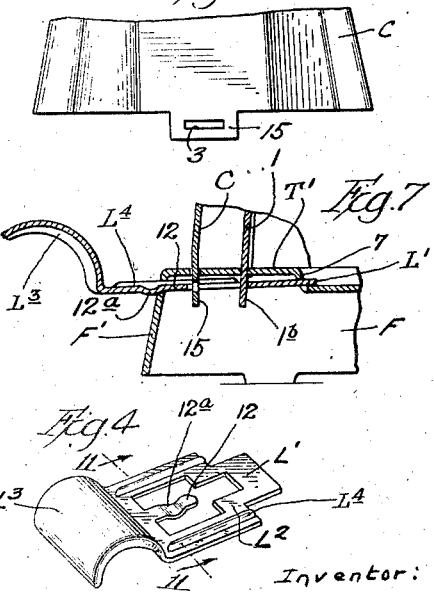
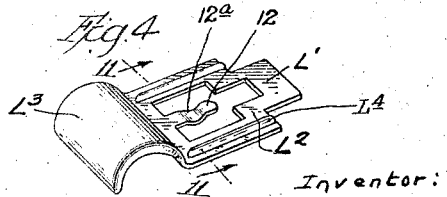
Inventor:
James J. Gough
by Albert Scheible
Attorney

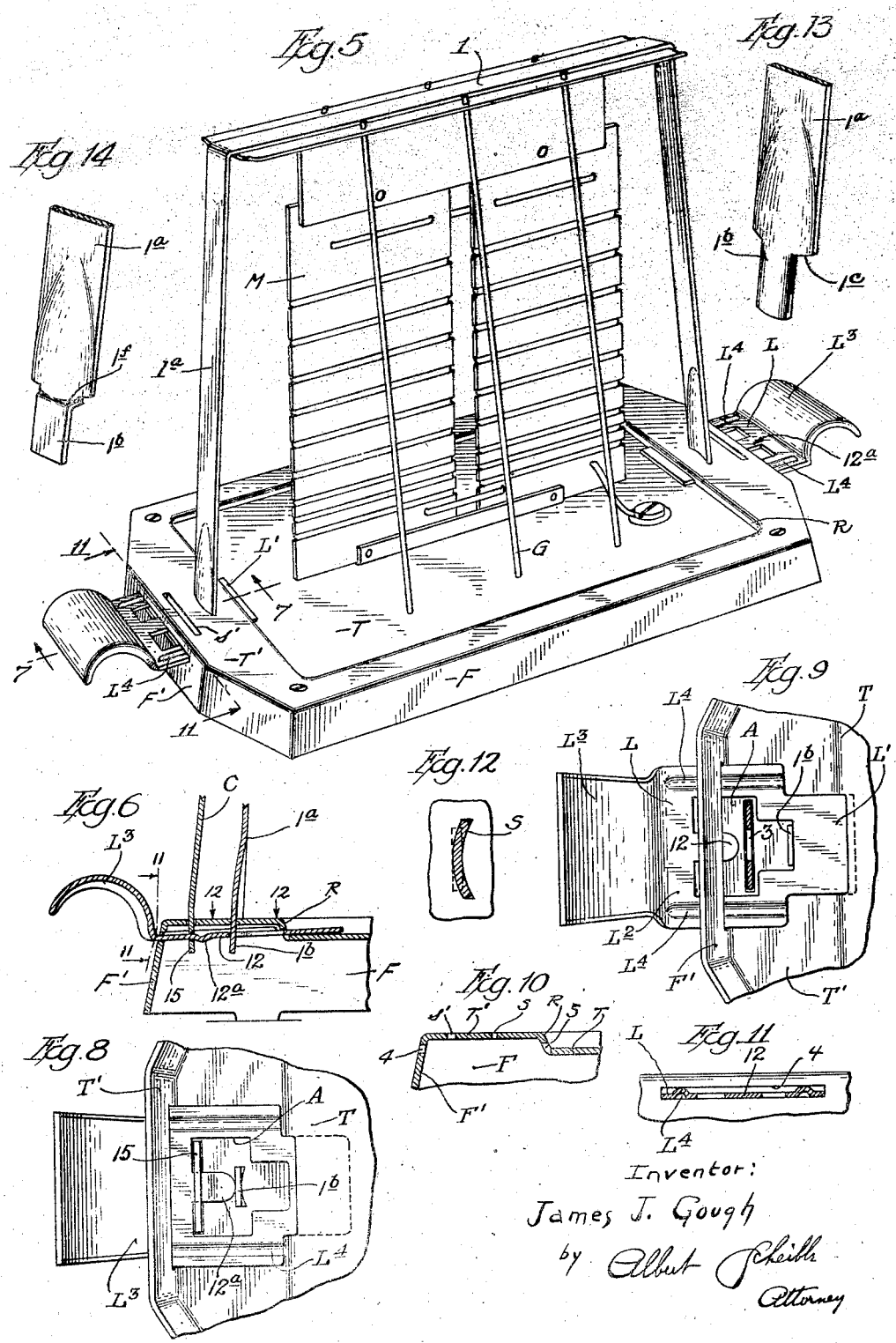

Patented Sept. 27, 1938

2,131,278

UNITED STATES PATENT OFFICE 2,131,278

ELECTRIC TOASTER WITH DETACHABLE SHELL

James J. Gough, Chicago, Ill., assignor to Chicago Electric Manufacturing Company, Chicago, Ill., a corporation of Illinois Refiled for abandoned application Serial No. 73,565, April 9, 1936. This application February 8, 1938, Serial No. 189,399.

17 Claims. (Cl. 53—5)

This application is a refiling of my application #73,565 on an Electric toaster, as filed April 9th, 1936.

My invention relates to an electric toaster of the household type in which an upright electric heating element is supported by and above a base member, and in which this heating element is housed by a door-equipped cap-like shell seated on the base member.

In its major objects, my invention aims to provide a toaster of this type in which the said shell is releasably latched to the base member, so that the shell can readily be detached manually from the base member to afford convenient access for removing the crumbs which collect within the shell when the toaster is in use; also to provide a toaster construction of this nature in which the means which afford the releasable latching of the shell to the base member will serve as the sole means for fastening the shell to the base member, thereby eliminating the rivets or other fastening elements usually employed for the last named purpose.

More particularly, my invention aims to provide an electric toaster construction of the above characteristics in which each end of the shell can readily be latched to, and unlatched from, the base member by simple movements of simple latching means which present a digitally manipulable portion outside the base member; these latching means desirably comprising two latching members each of which includes a handle whereby the toaster can be lifted, and means whereby each latching member will be yieldingly held in either its latched or unlatched position. Moreover, my new toaster construction includes parts fast with respect to the base member and serving as positive stops for limiting the movements of the latching means.

Furthermore, my invention aims to provide a construction for the above purposes in which integral parts of a support for the heating member of the toaster will serve respectively as stops for limiting the movements of the two latching members in both directions; and in which no additional screws or other fastening elements will be required for effecting a convenient releasability of the door-equipped shell from the rest of the toaster.

Illustrative of the manner in which I accomplish the above as well as more detailed objects, Fig. 1 is a perspective view of an electric toaster embodying my invention, as it appears when in use, with each of the two handled latching members in its normal latching position.

Fig. 2 is an end view of the same toaster, with a portion broken away, and with dotted lines showing a portion of a partly opened door.

Fig. 3 is an elevation of the lower portion of one end of the detached cap-like shell.

Fig. 4 is an enlarged perspective view of one of the slidable latching members.

Fig. 5 is a perspective view of the same toaster, taken after both latching members have been slid to their unlatching positions and the cap-like and door-equipped shell has been lifted off the base member.

Fig. 6 is an enlarged fragmentary section taken along the line 6—6 of Fig. 2, showing one of the latching members in the normal position in which it latches the cap-like shell to the base member.

Fig. 7 is a section allied to Fig. 6, but taken when the latching member has been slid to its released position to allow the shell to be lifted off the base member.

Fig. 8 is a bottom view of one end part of the toaster, with the latching member in its latching position of Fig. 6.

Fig. 9 is a bottom view allied to Fig. 8 but showing the latching member in its released position of Fig. 7.

Fig. 10 is an enlarged section taken along the line 10—10 of Fig. 2 through only one end of the base member, showing certain slots.

Fig. 11 is a fragmentary section taken along the line 11—11 of Fig. 6.

Fig. 12 is an enlarged horizontal section, taken along the line 12—12 of Fig. 6.

Fig. 13 is an enlarged perspective view of the lower portion of one of the riser elements of the support for the heating element, showing the shape of the said portion as initially formed.

Fig. 14 is a perspective view of the same portion as Fig. 13, showing the deforming of parts thereof during the fastening of the said riser element to the base member.

In the drawings, the base member of my toaster consists of a base top having flanges F depending from its periphery, the horizontal major portion T of the said top being connected by riser portions R to an outer, frame-like and also horizontal raised portion $T^1$, as shown in Fig. 10. Each end part of this raised portion has a slot S and also a more outward slot $s^1$, both of which slots have their midlengths in the medial and longitudinal vertical plane of the base member along which the section of Fig. 7 was taken in Fig. 5.

The heating element, here shown as comprising two wire-wound and upright mica sheets M, is suspended from the upper portion 1 of an inverted U-shaped element-support which has each of its shanks 1a extending and clinched through one of the said slots S in the base member to anchor the said support to the base member, the said upper portion 1 of the element-support being braced by the usual guard wires G against which the bread rests while being toasted. To provide for a convenient fastening of the lower part of each of the said shanks to the top of the base member, and to utilize a portion of each such shank as a stop tab for limiting the movements of the adjacent latching member in both directions, I desirably proceed as follows:

I make each inner slot S longitudinally curved to correspond to the curving of the lower end portion 1b of one of the said shanks as initially manufactured (Fig. 13), and make this lower end portion of substantially the same width as the length of the slot, but considerably narrower than the part 1a above it, so as to afford shoulders 1c adapted to seat on the base top when the said lower end portion 1b has been slid downward through the slot S, as shown in Fig. 14.

Seated upon the frame-like raised portion $T^1$ of the top of the base member is a flattened cap-like shell C which includes at each side a hinged door D normally closing a corresponding side opening in the shell. Each end of this shell has a tab 15 (Fig. 3) depending from it and normally extending through the outer slot $s^1$ (Fig. 5), and each such tab has a horizontal slot 3 which normally is below the lower face of the adjacent part of the base top. Each tab slot 3 alines with a horizontal slot 4 (Fig. 10) in the adjacent end flange $F^1$ of the base member and also with a slot 5 in the riser ledge R which connects the adjacent part of the raised portion $T^1$ of the base top with the main portion T of this base top.

Extending slidably through the alined slots 4 and 5 in each end portion of the base member is a latching member (shown separately in Fig. 4) in the form of a sheet metal punching which includes a flat inner end portion $L^1$ extending slidably through the said slot 5, a frame-like portion $L^2$ extending slidably through the end flange slot 4 (Fig. 10), and a handle-forming part $L^3$ disposed exteriorly of the base member.

After the thus narrowed end portion has been slid through the corresponding curved slot in the base top, the part below that top is flattened (and desirably also somewhat offset from the general plane of the main shank portion 1a) as in Fig. 14, so as to present upwardly facing shoulders 1f which engage the lower face of the base top to clinch the latter against the shank shoulders 1c.

With each shank of the element support thus fastened, the lower shank portion 1b then extends through the aperture A in the slidable latch member at that end of the toaster, thereby disposing this shank portion for engagement (as in Fig. 6) by the tip of a finger 12 (Fig. 4) which extends inwardly of the toaster base from the outer wall of the said aperture and through the slot 3 (Fig. 3) in the tab 15 of the adjacent shell end so as to latch the adjacent end of the shell to the toaster base. This finger desirably has a transverse ridge 12a which rides over the lower edge of the end slot 4 (Fig. 1) in the adjacent base flange $F^1$ when the latch member is slid from its just recited shell-latching position to the released position of Figs. 7 and 9 in which the inner end wall of the aperture A in the latch member engages the same shank tab.

Since the lower part or stop tab 1b of each riser of the support for the heating element, which riser is fastened to the base member, extends downwardly through the slot A (Fig. 8) in one of the latching elements, this stop tab is disposed for engaging the end walls of the said slot for positively limiting the movement of the corresponding latching element, so as to halt this movement either in the latching position of Figs. 6 and 8 or in the latch-releasing position of Fig. 7.

To reduce friction, the base end slot 4 preferably is wider (in height) than the metal from which the latching member was formed, and this member has spaced longitudinal ridges $L^4$ engaging the upper wall of the said slot, as shown in Fig. 9.

When the toaster is thus assembled with each latch member in the latching position of Figs. 6 and 8, the latch fingers firmly anchor the shell to the base member, but this anchoring is instantly released when the user slides each latching member out to its release position by pulls on the handles $L^3$ which also can be used at other times for lifting the toaster. So also, any lay user can easily set the shell down on the base again with each shank tab extending through the corresponding base top slot, after which the mere inward sliding of the two latching members again fastens the shell firmly to the base.

Since no auxiliary fastening elements are required for thus adding the two latching members to a toaster, the assembly is quite simple and expeditious, and the trifling cost of the easily stamped latching members is compensated by the convenience of the toaster lifting handles which they also afford. However, while I have heretofore described my invention in connection with an embodiment including many desirable details of construction, as for example the forming of the two spaced guideways for each latching member in approximately upright portions of the toaster base, many changes might obviously be made without departing either from the spirit of my invention or from the appended claims.

I claim as my invention:

1. An electric toaster, comprising a base member; a heating unit disposed above and supported by the base member; a cap-like shell having its mouth end seated upon the base member, the shell and the base member having interengaging parts defining the position of the shell on the base member; and manually actuable latching means for releasably clamping the shell to the base member, the said latching means being movably supported by the base member and having their latching portions concealed by the base member.

2. An electric toaster as per claim 1, in which the base member includes an elevated base top having spaced slots, in which the shell has tabs respectively fitting and extending downwardly through the said slots, in which each of the said tabs presents an upwardly facing shoulder spaced downwardly from the base top, and in which the latching means comprise two latching members each of which has a portion thereof adapted to be moved into and out of overlying relation to one of the said shoulders.

3. An electric toaster comprising a base member including a top and two flanges depending respectively from the ends of the said top, the top being formed to afford a horizontal guideway through each end flange, and the said top being provided near each end thereof with a slot; a heating unit disposed above and supported by the said base top; a cap-like shell freely housing the heating unit and having its mouth end seated upon the base top, the said shell having two tabs extending downwardly respectively through the said slots, and each tab being formed to present an upwardly facing shoulder spaced downwardly from the base top; and two latching members extending slidably respectively into the two guideways, each latching member having a portion thereof adapted to be moved into and out of overlying relation to the shoulder on the adjacent shell tab by sliding that latching member in relatively opposite directions.

4. An electric toaster as per claim 3, in which the part of each latching member which is disposed outside the adjacent end flange of the base member is bowed upwardly, whereby the said parts of the two latching means serve also as handles for lifting the toaster.

5. An electric toaster as per claim 3, in which each end portion of the base member is provided with two slots spaced longitudinally of the base member and jointly forming one of the said guideways.

6. An electric toaster as per claim 3, in which the base top has a depression presenting a depending ledge inwardly of and parallel to one of the said slots in the base top, the said ledge and the adjacent end flange of the base having alined slots jointly forming the guideway in which one of the latching members is slidable.

7. An electric toaster comprising a base member including a top and two flanges depending respectively from the ends of the said top, the top being formed to afford a horizontal guideway through each end flange, and the said top being provided near each end thereof with a slot; a heating unit disposed above and supported by the said base top; a cap-like shell freely housing the heating unit and having its mouth end seated upon the base top, the said shell having two tabs extending downward respectively through the said slots, and each tab being formed to present an upwardly facing shoulder spaced downwardly from the base top; and two latching members extending slidably respectively into the two guideways, each latching member having a portion thereof adapted to be moved into and out of overlying relation to the shoulder on the adjacent shell tab by sliding that latching member in relatively opposite directions; the base member also including two stop elements fast with respect to and depending from the said base top, each latching member having two spaced portions thereof respectively disposed for engaging one of the said stops.

8. In an electric toaster, a housing comprising a base member; a heating unit disposed above and supported by the base member; a cap-like shell having its mouth end seated upon the base member, the shell and the base member having interengaging parts defining the position of the shell on the base member; and manually actuable latching means for releasably engaging spaced portions of the shell so as to clamp the shell to the base member, the said latching means being movably supported by the base member and having their said engaging portions concealed by the base member.

9. A housing for an electric toaster as per claim 8, in which the latching means comprise two latching members respectively associated with the said spaced portions of the shell and each presenting an upwardly bowed portion exteriorly of the shell and base member assembly, whereby the said two portions of the latching members serve as handles for lifting the toaster.

10. A toaster housing as per claim 8, in which the base member includes an elevated base top having spaced slots, in which the shell has tabs respectively fitting and extending downwardly through the said slots, in which each of the said tabs presents an upwardly facing shoulder spaced downwardly from the base top, and in which the latching means comprise two latching members each of which has a portion thereof adapted to be moved into and out of overlying relation to one of the said shoulders.

11. An electric toaster housing comprising a base member including a top and two flanges depending respectively from the ends of the said top, the base member being formed to afford two guideways opening respectively through the two end flanges, and the said top being provided near each end thereof with a slot; a cap-like shell having its mouth end seated upon the base top, the said shell having two tabs extending downward respectively through the said slots, and each tab being formed to present an upwardly facing shoulder spaced downwardly from the base top; and two latching members extending slidably respectively through the two guideways, each latching member having a portion thereof adapted to be moved into and out of overlying relation to the shoulder on the adjacent shell tab by sliding that latching member in relatively opposite directions.

12. An electric toaster as per claim 11, in which the base member is provided near each end thereof with two parallel guide slots which are spaced longitudinally of the base member and jointly form one of the said guideways.

13. An electric toaster as per claim 11, in which the base top has a depression presenting a depending ledge inwardly of and parallel to one of the said slots in the base top, the said ledge and the adjacent end flange of the base having alined guide slots jointly forming the guideway in which one of the latching members is slidable.

14. An electric toaster comprising a base member presenting a raised top; a heating unit disposed above and supported by the base member; a cap-like shell normally having its lower end seated on the base member and having two tabs projecting downward through the top of the base member; and two latching members movably supported by and extending below the base and respectively adjacent to the said two tabs, each latching member and the tab adjacent thereto having portions thereof disposed for interengaging so as to clamp the shell to the said base when the latching member is in one position, and for releasing the said clamping when the latching member is in another position; the heating unit comprising a heating element and two riser elements, fast upon and extending downwardly through the said base top and respectively past the two latching members, each latching member having two spaced portions disposed for engaging the adjacent riser element to limit the movement of that latching member in opposite directions.

15. An electric toaster as per claim 14, in which each latching member has a perforation through which the lower part of the adjacent riser element extends, the said perforation having walls thereof forming the said spaced portions of the latching member.

16. A base and shell assemblage for an electric toaster, comprising a base including an elevated base top and flanges depending from each end of the said top, the base top having near each end thereof a slot parallel to the adjacent edge of the base top, and each end flange having a horizontal slot in its upper portion; a cap-like shell normally having its lower end seated on the said base top and having each end of the shell provided with a tab extending downwardly through the base top slot adjacent to that shell end, each tab having a horizontal guide slot disposed below the base top; and two latching members each extending slidably through and outwardly beyond the horizontal slot in the one end flanges of the base member; each latching member and the shell tab adjacent thereto having relatively interengageable portions disposed for latching the adjacent shell end to the base member when the latching member is in one position, and for releasing the said latching when the latching member is slid through another position.

17. A base and shell assembly for an electric toaster, as per claim 16, in which each shell tab has a slot, and in which each latching member has a finger movable into and out of the slot in the tab adjacent to that member, whereby the said finger and the lower wall of the tab slot constitute the said relatively interengageable portions.

JAMES J. GOUGH.